United States Patent
Masson et al.

(10) Patent No.: US 8,890,514 B2
(45) Date of Patent: Nov. 18, 2014

(54) MAGNETIC MULTI-PERIODIC ABSOLUTE POSITION SENSOR

(75) Inventors: Gérald Masson, Besançon (FR); Stéphane Biwersi, Frambouhans (FR)

(73) Assignee: Moving Magnet Technologies (MMT), Besançon (FR)

( * ) Notice: Subject to any disclaimer, the term of this patent is extended or adjusted under 35 U.S.C. 154(b) by 422 days.

(21) Appl. No.: 13/382,486

(22) PCT Filed: Jul. 7, 2010

(86) PCT No.: PCT/FR2010/051431
§ 371 (c)(1),
(2), (4) Date: Mar. 2, 2012

(87) PCT Pub. No.: WO2011/004120
PCT Pub. Date: Jan. 13, 2011

(65) Prior Publication Data
US 2012/0146627 A1 Jun. 14, 2012

(30) Foreign Application Priority Data
Jul. 7, 2009 (FR) ...................................... 09 03349

(51) Int. Cl.
*G01B 7/30* (2006.01)
*G01D 5/249* (2006.01)
*B62D 6/10* (2006.01)
*B62D 15/02* (2006.01)

(52) U.S. Cl.
CPC ................ *G01D 5/2492* (2013.01); *G01B 7/30* (2013.01); *B62D 6/10* (2013.01); *B62D 15/0215* (2013.01); *B62D 15/0245* (2013.01)
USPC .................................................. 324/207.21

(58) Field of Classification Search
CPC ................... B60R 21/015; B60R 2021/01525; B60N 2/4852; G01S 15/06; G01D 5/145; G01D 21/00; G01D 5/00; B60T 7/22; G01B 7/30; G01L 3/104
See application file for complete search history.

(56) References Cited

U.S. PATENT DOCUMENTS

| 3,061,771 A | 10/1962 | Planer et al. |
| 4,785,242 A | 11/1988 | Vaidya et al. |

(Continued)

FOREIGN PATENT DOCUMENTS

| CN | 101384883 | 3/2009 |
| DE | 102 39 904 | 3/2004 |

(Continued)

*Primary Examiner* — Vinh Nguyen
(74) *Attorney, Agent, or Firm* — Harness, Dickey & Pierce, P.L.C.

(57) ABSTRACT

The disclosure relates to a magnetic position sensor including at least one permanent magnet. The disclosure also relates to a magnetic device for detecting a torque between a first shaft and a second shaft that are connected via a torsion bar. The aim of the disclosure is to provide a device for determining the multi-periodic absolute position of a magnetized unit. The subject of the disclosure is therefore a magnetic position sensor including at least the following: a magnetized unit, a first magnetosensitive probe and a second magnetosensitive probe. The second magnetosensitive probe is capable of measuring a number of complete rotations of the magnetic field in an absolute, incremental and reversible manner so as to determine a second datum relating to the position of the magnet, whether or not this second magnetosensitive probe is powered. The sensor further includes a module for calculating the absolute position of the magnet on the basis of the first and second data coming from the first and second probes respectively.

15 Claims, 7 Drawing Sheets

(56) References Cited

U.S. PATENT DOCUMENTS

| | | |
|---|---|---|
| 4,966,041 A | 10/1990 | Miyazaki |
| 5,070,298 A | 12/1991 | Honda et al. |
| 5,159,268 A | 10/1992 | Wu |
| 5,200,747 A | 4/1993 | Betz et al. |
| 5,250,925 A | 10/1993 | Shinkle |
| 5,351,387 A | 10/1994 | Iwata et al. |
| 5,416,410 A | 5/1995 | Kastler |
| 5,444,313 A | 8/1995 | Oudet |
| 5,528,139 A | 6/1996 | Oudet et al. |
| 5,532,585 A | 7/1996 | Oudet et al. |
| 5,670,876 A | 9/1997 | Dilger et al. |
| 5,781,005 A | 7/1998 | Vig et al. |
| 5,814,985 A | 9/1998 | Oudet |
| 5,930,905 A | 8/1999 | Zabler et al. |
| 5,942,895 A | 8/1999 | Popovic et al. |
| 6,043,645 A | 3/2000 | Oudet et al. |
| 6,043,646 A | 3/2000 | Jansseune |
| 6,087,827 A | 7/2000 | Oudet |
| 6,219,212 B1 | 4/2001 | Gill et al. |
| 6,304,078 B1 | 10/2001 | Jarrard et al. |
| 6,326,781 B1 | 12/2001 | Kunde et al. |
| 6,384,598 B1 | 5/2002 | Hobein et al. |
| 6,466,889 B1 | 10/2002 | Schödlbauer |
| 6,512,366 B2 | 1/2003 | Siess |
| 6,515,571 B2 | 2/2003 | Takeda |
| 6,518,749 B1 | 2/2003 | Oudet et al. |
| 6,545,463 B1 | 4/2003 | Dettmann et al. |
| 6,552,534 B2 | 4/2003 | Desbiolles et al. |
| 6,573,709 B1 | 6/2003 | Gandel et al. |
| 6,576,890 B2 | 6/2003 | Lin et al. |
| 6,593,734 B1 | 7/2003 | Gandel et al. |
| 6,848,187 B2 | 2/2005 | Ito et al. |
| 6,922,052 B2 | 7/2005 | Steinruecken et al. |
| 6,935,193 B2 | 8/2005 | Heisenberg et al. |
| 6,941,241 B2 | 9/2005 | Lee et al. |
| 6,992,478 B2 | 1/2006 | Etherington et al. |
| 7,028,545 B2 | 4/2006 | Gandel et al. |
| 7,030,608 B2 | 4/2006 | Kawashima et al. |
| 7,049,808 B2 | 5/2006 | Martinez et al. |
| 7,088,096 B2 | 8/2006 | Etherington et al. |
| 7,116,210 B2 | 10/2006 | Lawrence et al. |
| 7,215,112 B1 * | 5/2007 | Recio et al. ............ 324/207.2 |
| 7,239,131 B2 | 7/2007 | Halder et al. |
| 7,304,450 B2 | 12/2007 | Prudham |
| 7,363,825 B2 | 4/2008 | Feng et al. |
| 7,501,929 B2 | 3/2009 | Lawrence et al. |
| 7,589,445 B2 | 9/2009 | Gandel et al. |
| 7,644,635 B2 | 1/2010 | Prudham et al. |
| 7,671,583 B2 | 3/2010 | Diegel et al. |
| 7,741,839 B2 | 6/2010 | Jarrard |
| 7,784,365 B2 | 8/2010 | Masson et al. |
| 7,898,122 B2 | 3/2011 | Andrieux et al. |
| 7,906,959 B2 | 3/2011 | Frachon et al. |
| 7,923,998 B2 | 4/2011 | Hammerschmidt |
| 8,072,209 B2 | 12/2011 | Jerance et al. |
| 8,587,294 B2 * | 11/2013 | Masson et al. ............ 324/207.24 |
| 2002/0024336 A1 * | 2/2002 | Desbiolles et al. ...... 324/207.25 |
| 2003/0155909 A1 | 8/2003 | Steinruecken et al. |
| 2003/0192386 A1 * | 10/2003 | Tokumoto et al. ........ 73/862.334 |
| 2004/0130314 A1 | 7/2004 | Bossoli et al. |
| 2005/0218727 A1 | 10/2005 | Gandel et al. |
| 2006/0123903 A1 | 6/2006 | Gandel et al. |
| 2007/0008063 A1 | 1/2007 | Lawrence et al. |
| 2007/0090827 A1 | 4/2007 | Jarrard |
| 2008/0150519 A1 | 6/2008 | Hoeller et al. |
| 2008/0250873 A1 | 10/2008 | Prudham et al. |
| 2008/0284261 A1 | 11/2008 | Andrieux et al. |
| 2008/0314164 A1 | 12/2008 | Masson et al. |
| 2010/0045275 A1 | 2/2010 | Frachon |
| 2010/0194385 A1 | 8/2010 | Ronnat et al. |
| 2010/0231205 A1 | 9/2010 | Jerance et al. |
| 2010/0253324 A1 | 10/2010 | Jarrard |
| 2011/0043194 A1 | 2/2011 | Frachon et al. |
| 2011/0184691 A1 | 7/2011 | Mehnert et al. |

FOREIGN PATENT DOCUMENTS

| | | |
|---|---|---|
| DE | 102006051621 | 5/2008 |
| EP | 0 273 481 | 7/1988 |
| EP | 0 665 416 | 8/1995 |
| EP | 1 014 039 | 6/2000 |
| EP | 1 219 527 | 7/2002 |
| EP | 1 353 151 | 10/2003 |
| EP | 1 477 772 | 11/2004 |
| EP | 1 532 425 | 5/2005 |
| FR | 2 670 286 | 6/1992 |
| FR | 2 724 722 | 3/1996 |
| FR | 2 764 372 | 12/1998 |
| FR | 2 790 549 | 9/2000 |
| FR | 2 809 808 | 12/2001 |
| FR | 2 845 469 | 4/2004 |
| FR | 2 893 410 | 5/2007 |
| FR | 2 898 189 | 9/2007 |
| FR | 2 919 385 | 1/2009 |
| JP | 2006-119082 | 5/2006 |
| KR | 2008-0077369 | 8/2008 |
| KR | 2008-0104048 | 11/2008 |
| WO | WO 99/11999 | 3/1999 |
| WO | WO 2005/076860 | 8/2005 |
| WO | WO 2007/014599 | 2/2007 |
| WO | WO 2007/057563 | 5/2007 |
| WO | WO 2007/099238 | 9/2007 |
| WO | WO 2008/101702 | 8/2008 |
| WO | WO 2009/047401 | 4/2009 |
| WO | WO 2009/101270 | 8/2009 |

* cited by examiner

MAGNETIC MULTI-PERIODIC ABSOLUTE POSITION SENSOR

CROSS-REFERENCE TO RELATED APPLICATIONS

This application is a National Phase Entry of International Application No. PCT/FR2010/051431, filed on Jul. 7, 2010, which claims priority to French patent application Ser. No. 09/03349, filed on Jul. 7, 2009, both of which are incorporated by reference herein.

TECHNICAL FIELD

The present invention relates to the field of magnetic position sensors comprising at least one permanent magnet. More precisely, the present invention relates to the field of linear or rotary magnetic position sensors for angles greater than around ten degrees and possibly ranging up to several turns. One particularly advantageous usage is in position sensors intended for measuring the angular position of an automobile steering column, without this application being exclusive. The invention also relates to the field of magnetic devices for detecting a torque between a first shaft and a second shaft that are connected by a torsion bar, especially one intended for an automobile steering column.

BACKGROUND

In the case of this application, the angular position of the steering column and of the steering wheel is an information item necessary for functions such as ESP (electronic stability program) and EPS (electric power steering). The information about the steering angle, and therefore the angle of the wheels, may also be used for complementary functions such as directional headlamps, trajectory control, automatic parking, etc.

A one-turn sensor cannot by itself detect the position of the steering column of most automobiles, the steering wheel of which must be able to rotate through more than one turn. One solution may be to combine a 360° sensor with a "top turn" to know in which turn the steering wheel is. This is for example described in the patent application WO 07/014,599. These systems assume an initial position on being energized. All the positions that follow are relative to this starting position. The problem posed by this type of system is therefore that this initial position is redefined each time that the contact of the automobile is established. If this system does not have a memory of the last position of the steering wheel angle or if the angle is changed when the contact is cut, the angle indicated upon contacting will be erroneous.

The specifications for a steering column application are very stringent. Specifically, this application requires an absolute sensor capable of ranging up to ±720° (±2 turns) or even ±1440° (±4 turns) with a precision of better than ±1° and a resolution of better than 0.1°. To do so, there are various absolute multiturn solutions for angle measurement and these employ diverse potentiometric, optical, inductive or even magnetic, technologies.

The optical solutions such as those described for example in EP Patent No. 1 219 527 or U.S. Pat. No. 6,848,187 are complicated and expensive, and may prove to be incompatible with being mounted in the engine compartment because of their incompatibility with the temperature and environmental conditions thereof. The inductive solutions, such as those described for example in U.S. Pat. No. 6,384,598, are very expensive in terms of development and refinement on a steering column. The potentiometric solutions have great advantages, mainly the cost and simplicity thereof. For example, in the prior art U.S. Pat. No. 5,200,747 teaches an absolute multiturn sensor composed of two potentiometric 360° sensors.

However, it should be noted that there is a major drawback with this solution due to the rubbing between the contact and the tracks of the potentiometer, thereby reducing the lifetime of the sensor. In addition, the tracks may deteriorate upon contact with dust, oil or other liquids. Thus, the trend is to replace potentiometers with non-contact systems.

Also known from the prior art are magnetic non-contact solutions that calculate the absolute position of a rotary member from the continuous phase difference between two rotary sensors, as described for example in U.S. Patent Publication No. 2005/000288286, JP Patent No. 2006/119082, and U.S. Pat. Nos. 6,941,241, 5,930,905 and 6,466,889. The principle of these sensors is the same: they are composed of a toothed wheel linked to the steering column, which drives two gears having slightly different numbers of teeth, each gear being fastened to a magnet.

The rotation of each magnet is detected by a magnetosensitive probe and then the phase-shifted signals are processed by an algorithm. The precision of the measured absolute angle therefore depends on the difference between two signals output by two different sensors and also on the calculation algorithm. The subtraction of two signals, to obtain a single measurement, is a great drawback. This reduces the precision by a factor of two relative to the precision of one of the two sensors taken individually. The slightest error in one of the two sensors, the slightest mechanical phase difference or the slightest slack in one of the gears introduces an error in measuring the angle. In addition, this requires a very sophisticated algorithm to calculate the absolute angle of the rotary member. The use of mechanical reduction gears is not an entirely non-contact solution, and therefore adds friction in the system (the gears of the gearing are wearing parts and therefore limit the lifetime). Furthermore, the addition of these gears, and also the complexity of assembling the complete sensor, makes the system expensive and precludes having a compact system.

This same principle of measuring the continuous phase difference in order to deduce therefrom the position of the rotary member is also used in the following: U.S. Patent Publication No. 2003/0145663, EP Patent No. 1 353 151, U.S. Pat. No. 6,515,571 and U.S. Pat. No. 7,215,112. These documents have two multipole magnets or one magnet with two multipole tracks having a slightly different number of pairs of poles in order to create a continuous phase difference depending on the angle of the rotary member to be detected. This principle is also found in the patent application WO 2008/101702 with a single magnet and a single track, but with poles of different angular width. These principles based on a multipole magnet have the same drawbacks as the principle mentioned above employing two toothed wheels having slightly different numbers of teeth.

Also known from the prior art is the patent application WO 2005/076860 which describes an absolute multiturn torque/position sensor in which the position of the rotary member is measured according to the principle of U.S. Pat. No. 5,200,747, i.e. the position is measured by two sensors, namely a 360° sensor linked directly to the rotary member and an incremental second sensor driven by a Geneva-type wheel. Unlike U.S. Pat. No. 5,200,747, the sensors used are not potentiometric but are of the non-contact magnetic type. Each of the two sensors has a ring magnet and two magnetosensitive elements spaced apart by 90°, which measure the radial component of the field generated by the magnet, resulting in two sinusoidal signals in quadrature that are decoded in order to determine the position over 360°.

This patent application WO 2005/076860 solves the problem of measurement with contacts of U.S. Pat. No. 5,200,747, but there is again however the major drawback of using mechanical reduction gears, which complicates matters and poses friction, assembly and lifetime problems. Another drawback of this solution is the presence of two probes, thereby possibly introducing a measurement error due to the incorrect placement of one probe relative to the other. Also, the presence of two integrated circuits, spatially separated by 90°, increases the final cost of the sensor since the printed circuit area may be large and the number of connections is increased.

Moreover, in the prior art, the applicant's patent application WO 2007/057563 teaches a 360° rotary position sensor and uses a magnetosensitive probe to determine the angular position of a ring magnet or a disk magnetized substantially diametrically. In that patent, the probe sensitive to the direction of the magnetic field generated by the magnet is placed to the outside of the magnet, thus making it possible to obtain a through-shaft rotary sensor intended for example to measure the angle of rotation of a steering column. In addition, that application describes the use of the sensor combined with a reduction in the movement so as to bring the rotation over several turns back down to a rotation of one turn or less at the sensor. The major drawback of this solution is the fact of using an n-fold reduction, thereby reducing the resolution and the precision accordingly, which can prove to be insufficient for such a steering column application in which the required precision and resolution are very high. Moreover, this solution uses, once again, a mechanical reduction gear system which has the same drawbacks as those mentioned above.

Moreover, in the prior art, the patent application WO 2009/047401, filed by the applicant, discloses a non-contact 360° position sensor for absolute multiturn detection. The non-contact first sensor is used to measure the rotation angle of the rotary member from 0 to 360° and the second sensor is used to determine the number of complete rotations of the rotary member. A mechanical system for continuous n-fold reduction is incorporated between the two sensors. This solution thus makes it possible to increase the reliability of the measurements while still advantageously adapting it to various geometric configurations (2-turn sensor, 3-turn sensor, etc. with the same precision and resolution whatever the number of turns), especially in the case of a through-shaft device. However, the precision of the sensor is determined by the precision of the sensor that measures the absolute rotation angle of the rotary member, this precision being limited to ±2°, this being insufficient for automobile steering column applications. However, above all this system also uses a mechanical reduction system with the aforementioned drawbacks.

Likewise, in the prior art, the patent DE 102007039051 which discloses a revolution counter technology based on the use of a Wiegand wire. Each time that a magnetic transition passes in front of the wire, the sudden orientation of the magnetic domains of the wire generates a voltage in the coil encircling it, which voltage is used by a counting unit to increment a number of turns and store it in a nonvolatile memory. However, this method is dependent on a [Wiegand wire (detection of the passage of the magnets)+coil (detection of the magnetic modification in the wire)+counting unit (which sends the information about a detected turn)+nonvolatile memory (which stores the number of turns made)] assembly and therefore requires many components to function. In addition, in the configuration described, the sensor can be produced only on the end of a shaft, with no possibility offered as a through-shaft construction. Finally, to count the number of turns and know whether this number is increasing or decreasing, the sensor must be supplied with current in order for the auxiliary probes to determine the sense of rotation.

Also known from the prior art are magnetic torque sensors combined with revolution counter solutions such as, for example, that described in U.S. Patent Publication No. 2006/0236784. This sensor simply has a magnetic torque sensor placed end-to-end with a magnetic multiturn position sensor. The sensor is therefore bulky, requires the use of several printed circuits or a flexible printed circuit, since the Hall components lie in different planes, and requires magnetic interaction between the torque and position sensors.

In addition, we may find in the prior art a patent WO 2009/047401 by the applicant that discloses a torque/position sensor in which the magnet of the position sensor is also cunningly integrated into the stator part. However, the counting of revolutions takes place using mechanical reduction systems having the drawbacks already mentioned in the first part of this patent. In addition, the precision obtained with this sensor is ±0.5% over 360° (i.e. an angular precision of ±2)°, which is not good enough for steering column applications.

SUMMARY

The aim of the present invention is to solve the problems posed by the prior art, by producing a non-contact position sensor of greater reliability and greater precision. To do this, the invention proposes a magnetic position sensor comprising at least a magnetized unit, a first magnetosensitive probe and a second magnetosensitive probe; the first and second magnetosensitive probes being stationary relative to each other; the magnetized unit being movable with respect to these first and second magnetosensitive probes over a displacement travel and having an absolute position at each instant; said magnetized unit producing, in the vicinity of said first magnetosensitive probe, a magnetic field having, on the one hand, a normal component and, on the other hand, at least one tangential or transverse component, varying sinusoidally and periodically over N periods distributed over the displacement travel, N being a number greater than 1; and said first magnetosensitive probe being capable of measuring at least two of the three components of the magnetic field so as to determine a first datum relating to the position of the magnetized unit. The second magnetosensitive probe is capable of measuring, in an absolute, incremental and reversible manner, a number of complete rotations of the magnetic field so as to determine a second datum relating to the position of the magnet, whether or not this second magnetosensitive probe is powered, and the sensor including a module for calculating the absolute position of the magnet from the first datum and the second datum.

In a general embodiment of the position sensor, a first magnetosensitive probe measures two of the three components (or measures the angle directly) of the magnetic field generated by the magnetized unit (1) and decodes the position of the magnetized unit from these two components, the amplitudes of which are in general different, making it necessary to normalize the two components used in order to be able to calculate the arctangent so as to deduce the position thereof. These arctangent and normalization functions are carried out either by a separate component or directly by a probe (for example, MELEXIS 90316 or HAL 3625) integrating the measurement of the two components of the field, the calculation of the arctangent and the normalization of the two components of the field. It is possible to make particular developments in which the components of the field would have substantially the same values, for example by suitably choosing the position and the orientation of the probe, by using particular magnet geometries, by having particular magnetizations, or finally by placing field concentrators at the first probe. After position decoding, a linear periodic signal is obtained as output from this first probe which depends on the position of the magnetized unit relative to this first probe.

A second magnetosensitive probe is then used to distinguish the current record and thus determine absolutely the position of the magnetized unit relative to the probes. Specifically, since the output signal is repeated n times over the desired travel, we are unable, just with the first signal output by the first probe, to deduce the position of the magnetized unit therefrom, and this is why the invention proposes adding a second probe which makes it possible to define in which linear portion the system is in on the basis of the same magnet as that which generates the magnetic field seen by the first probe. As an example, it is possible to use a component based on the rotation of the magnetic moments (as described in the patents EP 1 532 425 B1 and EP 1 740 909 B1). The magnetic domains rotate continuously at the same time as the rotation of the magnetic field generated by the magnetized unit in which it lies, but they propagate within a magnetic circuit only at each rotation of the magnetic field in order to obtain, in the end and as processing output, a signal which is incremented or decremented in a discrete but absolute manner every 360° of rotation of the magnetic field. This therefore makes it possible to distinguish absolutely in which period the system lies. In addition, as such a component is based on the rotation of the magnetic domains, even when the probe is not powered, and even when there is a displacement between the magnet and this second, so-called ASIC, magnetosensitive probe, the magnetic domains rotate and propagate to a greater or lesser extent according to this displacement. As soon as the electrical contact is established, no position is then lost. This system is then commonly said to be a TPO (true power on) system and operates in the two directions of movement without introducing any hysteresis.

Figure 7:
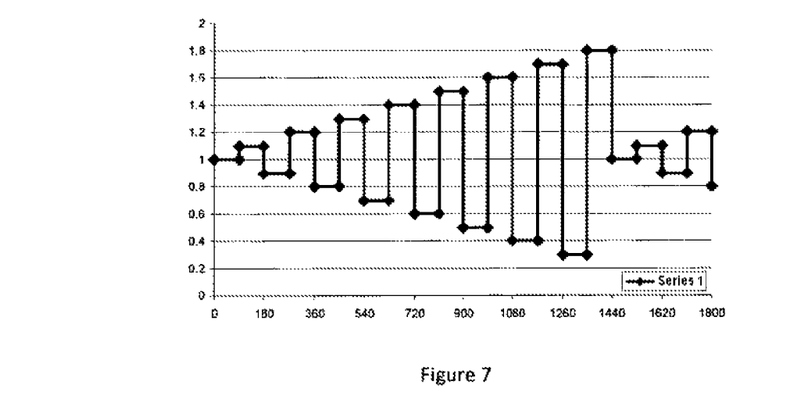
in FIG. 7, the signal obtained as output by the probe (3) as a function of the rotation of the magnet (1)

Unlike the patent DE 102007039051, in which the revolution counter assembly requires sending, via the coil associated with the Wiegand wire, electric pulses addressing a non-volatile memory, the present component used makes it possible, by itself, to measure and count the number of revolutions by modification of its physical properties (see FIG. 7). The assembly produced is thus compact and makes it possible to be shifted to the periphery of the magnet in the case when detection of a through-shaft is required. In addition, the assembly makes it possible to count the number of revolutions carried out and the direction thereof (incrementation or decrementation), without the need to supply electrical power to the sensor (operation in TPO mode).

The solution proposed by the present application makes it possible to obtain a completely non-contact solution and therefore to dispense with additional mechanical parts, to simplify the sensor and to reduce its manufacturing cost, while increasing its precision. This solution thus makes it possible to increase the reliability of the measurements while still advantageously adapting it to various geometric configurations (2-turn sensor, 3-turn sensor, etc.) and adapting it to the desired precision, especially in the case of a through-shaft device.

According to particular embodiments:
the magnetized unit has a magnetization direction that can vary continuously along the displacement direction, such as for example described in the applicant's patent application FR 2 898 189;
the magnetized unit has a magnetization direction varying linearly along the displacement direction;
the magnetized unit has an alternation of North-South magnetized poles; and
the magnetized unit has a unidirectional magnetization and has at least one of its dimensions that varies in a non-constant manner so as to generate, in the vicinity thereof, a sinusoidal variation of its tangential and normal (or axial) components, as presented in the patent application FR 2 909 170.

Moreover, according to alternative embodiments:
the magnetized unit has an annular shape and a magnetization direction in the plane perpendicular to the rotation axis of the magnetized unit; and
the magnetized unit has a disk shape and a magnetization direction perpendicular to the plane of the disk.

We point out that any means known from the prior art for sinusoidally varying the components of the magnetic field produced by the magnetized unit at the vicinity thereof may be envisioned within the context of this invention.

In the vicinity of these magnets, the magnetic field generates substantially sinusoidal tangential ($B_t$), normal ($B_n$) and transverse ($B_z$) components of period $2\pi/N$. The components $B_n$ and $B_z$ have the same phase, whereas the component $B_t$ is phase-shifted by one quarter of a period. A first magnetosensitive probe is used which integrates the measurement of two components of the field, calculates the arctangent and normalizes the two components of the field, if necessary.

If the components $B_t$ and $B_n$ in a point in space that surrounds the magnet is measured using the first probe, it is possible to determine the linear position of the magnet to within $2\pi/N$ by applying the following formula:

$$\Theta = \arctan\left(G_t \frac{B_t}{B_n}\right) \text{ to within } 2\pi/N,$$

where:
$\Theta$ is the angular position of the magnet and $G_t$ is a gain for amplifying the tangential component, if required.
In a more general case, the following formula may be used:

$$\Theta = \arctan\left(G_t \frac{B_t}{B_{nz}}\right) \text{ with } B_{nz} = kn \cdot B_n + kz \cdot B_z.$$

In a general case, decoding of the angular position of the magnetized unit on the basis of these two components, the amplitudes of which are in general different, requires the two components used to be normalized so as to be able to calculate the arctangent so as to deduce the linear position thereof. The precision of the linear portions is of the order of $\pm 0.3\%$ over a period of length $2\pi/N$. Thus, the shorter the period, in other words the larger N, the higher the angular precision and we are therefore able to adjust the number of periods N to a desired level of precision.

Preferably, the first and second magnetosensitive probes are positioned on one and the same printed circuit. This probe (3) may be limited by the number $N_r$ of complete rotations of the field that it can distinguish depending on the application. For example, if it is integrated so as to face our magnetized unit that comprises N periods, it will deliver a maximum of $N_r$ values of different increments and therefore in the end the sensor will be absolute with a very high precision over $N_r/N$ revolutions. Thus, if we wish an absolute sensor over a defined number of revolutions, it will be necessary to adjust the number of periods of the magnetization in order to obtain an absolute sensor over the correct number of revolutions.

Owing to one particular embodiment, the invention may be envisioned in linear application. The magnetized unit then extends linearly along the displacement direction.

In this version, there is a magnet in strip form, the magnetization direction of which varies continuously along the displacement direction. A first probe measures the radial, normal and axial components so as to determine the position of the magnet, within a period. An absolute incremental second probe is used to count the number of rotations of the magnetic field generated by the magnetized unit. According to another embodiment, the magnetized unit has a shape that extends over an angular width of less than 360°. In this way, the position signal obtained by combining the signals from the first and second probes is very precise.

The present invention also proposes to produce a torque sensor comprising a position sensor as described above. To do this, the invention proposes a magnetic device for detecting a torque between a first shaft and a second shaft that are connected by a torsion bar, which device is especially intended for an automobile steering column, comprising: a position sensor as defined above; a rotor first magnetic structure fastened to the first shaft and comprising a plurality of radially oriented magnets; a stator second structure fastened to the second shaft and comprising two rings extended by imbricated and axially oriented teeth; and a stationary collecting third structure consisting of two flux closure pieces that define at least one gap in which at least a third magnetosensitive probe is placed.

According to advantageous embodiments:

the first, second and third probes are placed on the same printed circuit;

the magnetized unit is in the form of a ring located around the teeth; and the plurality of magnets belong to the magnetized unit.

This construction thus makes it possible to obtain a multiturn absolute torque/position sensor, the axial and radial dimensions of which are the same as those of just a torque sensor simply by adding a magnet and two probes and reusing all the other parts of the torque sensor. In this configuration, the magnet of the torque sensor and the magnet of the position sensor are concentric and all the Hall components lie in the median plane of the magnets, which is perpendicular to the rotation axis of the sensors. This has the advantage of being able to insert all the Hall components on a single printed circuit and to eliminate the magnetic interaction of one sensor on the other.

In addition, the cost of such an integrated sensor is reduced by commoning the parts of which is it composed. The magnet of the position sensor and the concentric rings of the torque sensor may be overmolded at the same time and therefore form only a single part, and likewise in the case of the Hall probes of the torque/position sensor that form part of one and the same printed circuit. According to this preferred embodiment, the angular width of the collectors will be chosen to be equal to or K periodic with the angular width of a period of the magnet of the position sensor.

This embodiment provides a multiturn torque/position sensor solution that judiciously combines the 1st preferred embodiment with a magnetic torque sensor, such as for example that described in the patent FR 2 872 896 and using only a single common magnet for the two sensors. Thus, this magnet is the source of the field for the torque sensor and for the position sensor, all the electronic components being placed on the same printed circuit. In this configuration, the stators must be moved axially away from the torque sensor so that the first and second probes can measure the field generated by the single magnet. The axial dimension is larger, but this makes it possible to reduce the cost of the sensor using only a single magnet.

Instead of separating the torque stators from one another, it is also possible to extend the magnet of the torque sensor so as to make it extend axially beyond one or more stators and to place the first and second probes at the periphery thereof. This also makes it possible to have a single magnet, but with the drawback of having two separate printed circuits for the probe associated with the torque sensor and for the probes of the position sensor.

The invention also relates to a magnetic device for detecting a torque between a first shaft and a second shaft that are connected by a torsion bar, which device is especially intended for an automobile steering column, comprising: a position sensor as defined above, an auxiliary magnetized unit and an auxiliary magnetosensitive probe; the magnetized unit of the position sensor being fastened to the first shaft so that the position sensor is capable of delivering first position information items relating to an angular position $\Theta_1$ of this first shaft; the auxiliary magnetized unit being fastened to the second shaft and able to move with respect to the auxiliary magnetosensitive probe, this auxiliary probe being capable of delivering second position information items relating to an angular position $\Theta_2$ of the second shaft; and the device including a central processing module capable of calculating a difference in angular position between the first shaft and the second shaft from a combination of the first and second position information items, such that:

$$\frac{GG_1B_{t1} - G_2B_{t2}}{GB_{n1} + B_{n2}} = -\tan\left(\frac{N}{2}(\Theta_1 - \Theta_2)\right)$$

where:

$B_{n1}$ is the normal component, measured by the first probe, of the field generated by the magnetized unit;

$B_{n2}$ is the normal component, measured by the auxiliary probe, of the field generated by the auxiliary magnetized unit;

$B_{t1}$ is the tangential component, measured by the first probe, of the field generated by the magnetized unit;

$B_{t2}$ is the tangential component, measured by the auxiliary probe, of the field generated by the auxiliary magnetized unit.

The torque is calculated by using the measurement of the relative angle between the two shafts, i.e. $(\Theta_1-\Theta_2)$. Given that we have two identical magnets that generate a periodic sinusoidal magnetization, the following may be written:

$$B_{n1}=|B_{n1}|\sin(N\Theta_1) \text{ and } B_{t1}=|B_{t1}|\cos(N\Theta_1)$$

$$B_{n2}=|B_{n2}|\sin(N\Theta_2) \text{ and } B_{t2}=|B_{t2}|\cos(N\Theta_2).$$

Knowing that:

$$\frac{\cos(\Theta_1) - \cos(\Theta_2)}{\sin(\Theta_1) + \sin(\Theta_2)} = -\tan\left(\frac{\Theta_1 - \Theta_2}{2}\right),$$

it is therefore possible to deduce therefrom the relative angle between the two shafts using the formula:

$$\frac{GG_1 B_{t1} - G_2 B_{t2}}{GB_{n1} + B_{n2}} = -\tan\left(\frac{N}{2}(\Theta_1 - \Theta_2)\right)$$

where G, $G_1$ and $G_2$ are such that (equating the norms): $|B_{n1}|=G_1|B_{t1}|$ and $|B_{n2}|=G_2|B_{t2}|$ and $G|B_{n1}|=|B_{n2}|$.

This embodiment therefore makes it possible, by adding, to the sensor linked to the input shaft, which is defined by the first embodiment, only an identical magnet but linked to the output shaft and also one and the same first probe, to be able to obtain a multiturn torque/position sensor with a minimum number of parts. Specifically, we no longer have in this configuration the need for stators and collectors for the torque sensor, which were expensive parts.

BRIEF DESCRIPTION OF THE DRAWINGS

Other features and advantages of the invention will become apparent on reading the following description of detailed embodiments, with reference to the appended drawings which show respectively.

DETAILED DESCRIPTION OF EMBODIMENTS

Figure 1:
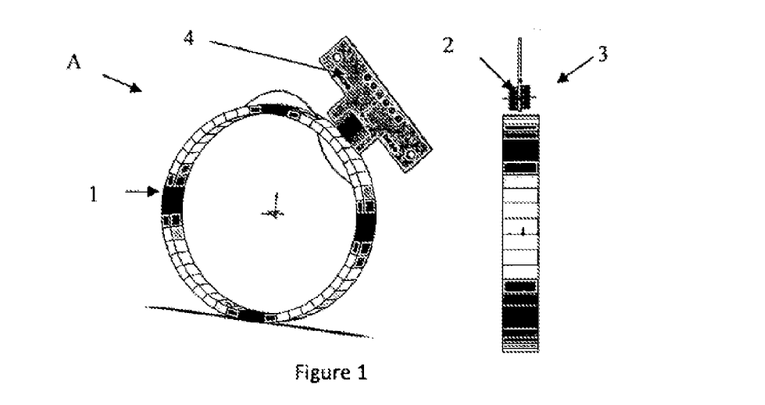
in FIG. 1, the position sensor according to a preferred embodiment with a ring magnet.

FIG. 1 shows a high-precision single-turn or multiturn position sensor (A) according to a first embodiment. It consists of a magnet (1) having several magnetization periods. The magnetization direction thus varies continuously along the direction of angular displacement of the magnet (1) and is repeated, in this nonlimiting example, four times over the 360° of the magnet (1).

Positioned close to the magnet (1) is what is called a first probe (2), which is placed on a printed circuit (4) and measures the direction of the magnetic field generated by the magnet (1) but not its amplitude. For example, it is possible to envisage using Hall-effect probes such as MLX90316, 2SA10 or magnetoresistance (AMR, GMR, etc.) probes. In the vicinity of this probe, the magnetization generates a magnetic field, the components of which are substantially sinusoidal.

Figure 3:
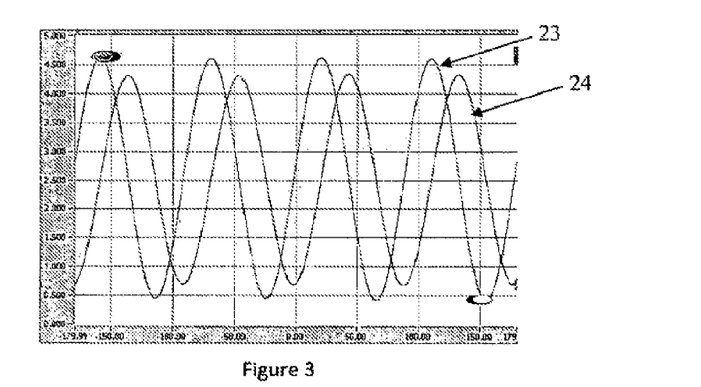
in FIG. 3, the sinusoidal signals read by the probe (2) in the vicinity of the magnet (1) according to FIG. 1 or 2.

FIG. 3 shows, as a function of the position (in degrees) the variation of the amplitude (in volts) of the radial component (23) and the tangential component (24) that are measured by the probe (2) using a magnet and a magnetization that are as shown in FIG. 1. From the two measured sinusoidal signals, it is possible to determine the linear position of the magnet by applying the following formula:

$$\Theta = \arctan\left(G\frac{B_t}{B_n}\right)$$

in which:
  $\Theta$ is the angular position;
  $B_t$ is the tangential component of the magnetic field;
  $B_n$ is the normal component of the magnetic field; and
  G is a corrective gain.

Figure 2:
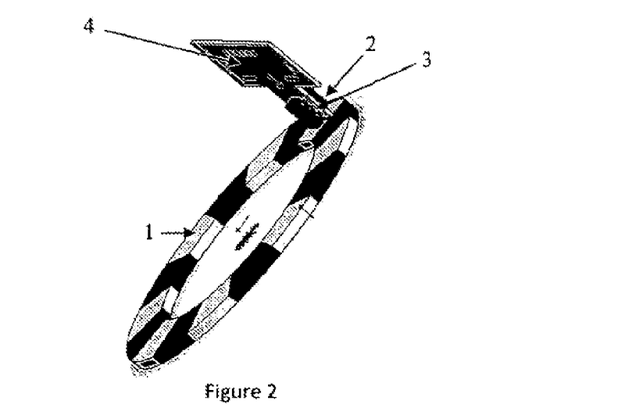
in FIG. 2, the position sensor according to a second embodiment with a disk magnet.
Figure 4:
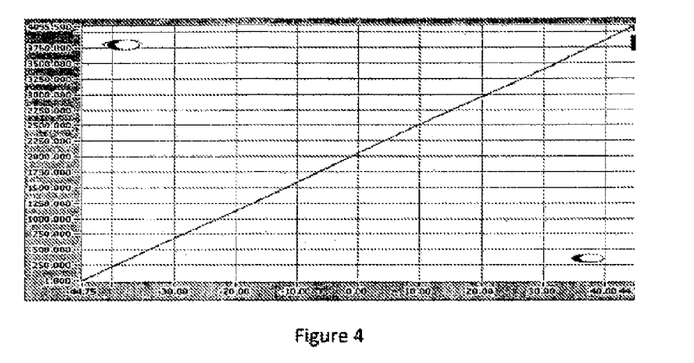
in FIG. 4, the position signal calculated, over one period of the magnetization, from the signals visible in FIG. 3.

By applying this formula to the measured signals of FIG. 2, an output signal is obtained as shown in FIG. 4, this signal being expressed here in volts, being linear as a function of the position, expressed here in degrees, and periodic with a period of 90°.

Figure 5:
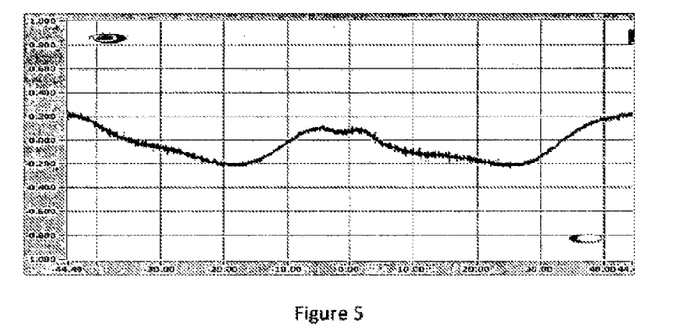
in FIG. 5, the nonlinear signal relating to the position signal according to FIG. 4.

As may be seen in FIG. 5, which shows the variation, as a percentage, of the nonlinearity as a function of the position, expressed in degrees, the signal obtained exhibits very good linearity over a period of 90°. As an example, the typical value is about 0.3%, corresponding to 0.27°.

Figure 6:
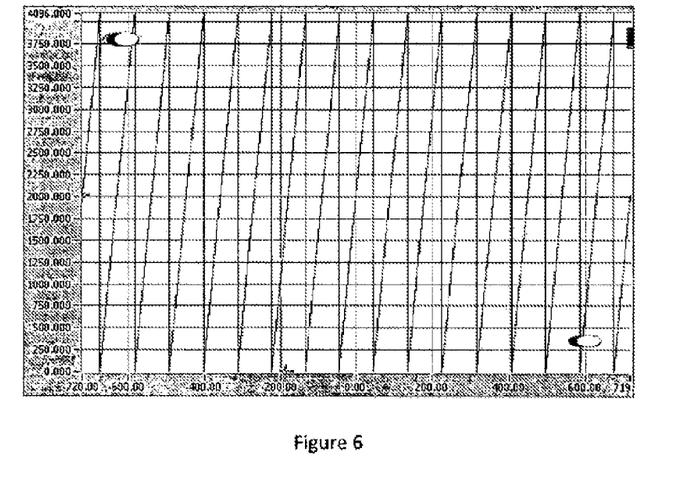
in FIG. 6, the position signal given by the probe (2) over four revolutions of the magnet (1)

In the case of FIG. 1, if we consider four magnetization periods, the output signal is therefore repeated four times per revolution. Considering a rotation of four revolutions of the magnet (1), what we will have is thus a pattern, as shown in FIG. 4, which is repeated sixteen times as shown in FIG. 6, showing the variation of the signal, expressed in volts, as a function of the position expressed in degrees. Since the repeated pattern is always identical within these sixteen periods obtained, it is not possible to deduce the angular position of the magnet. This function is made possible by using an absolute incremental probe (3), shown in FIG. 1, which is placed advantageously on the same printed circuit (4) supporting the probe (2), close to the magnet (1). This absolute incremental probe (3) serves to determine in what linear portion the system lies, again using the same magnet (1).

This absolute incremental probe (3) makes it possible to detect, in an absolute manner, the number of rotations made by the magnetic field of the magnet (1), whether or not the absolute incremental probe (3) is supplied with electrical current. Detection is thus effected by modification of the physical properties of the absolute incremental probe (3). The absolute incremental probe (3) is limited by the number $N_r$ of complete rotations of the field that may be distinguished. For example, if it is integrated facing a magnet with several magnetization periods $N_{pp}$, this component will deliver a discrete signal (IV, values) which will be periodic with a period of $N_r/N_{pp}$.

Thus, for example using the magnet of FIG. 1, the output signal from the absolute incremental probe (3), assuming that it is limited to sixteen complete rotations of the magnetic field, has a different output voltage every 90° (360/4) and is periodic for the period of 4 turns (16/4=4 turns) as shown in FIG. 7 which shows the variation of the signal, in volts, as a function of the position, expressed in degrees. Using a magnet (1) with a magnetization direction that varies continuously over a period of 90°, it is therefore possible to obtain a multiturn position sensor (4 turns in the case of FIG. 1) with a typical precision of around 0.2°.

This embodiment is in no way limiting. Thus, the present invention may be carried out in various ways and especially using a magnet (1) in the form of a disk, as shown in FIG. 2. The disk magnet (1) has an alternation of North-South magnetized poles along several periods over the 360° of the magnet. In this embodiment, the magnetization direction is perpendicular to the surface of the disk.

Figure 8:
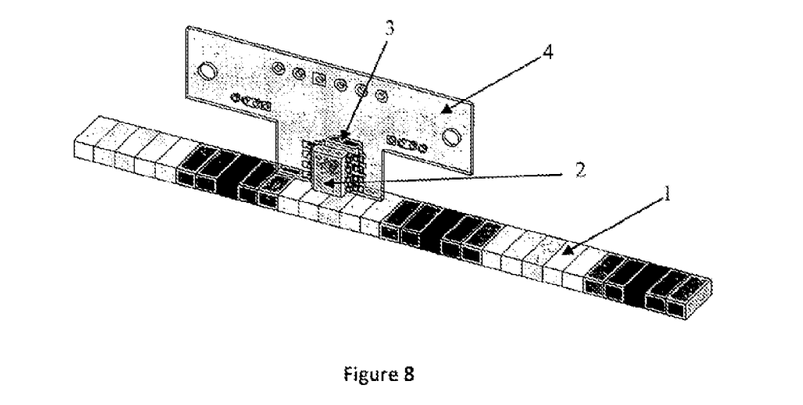
in FIG. 8, a linear displacement sensor according to the invention.

Likewise, linear versions may be imagined such as, for example, that described in FIG. 8, showing a magnet (1) having a continuously variable magnetization direction over several periods. This again shows, placed on the same printed circuit (4), the probe (2), which measures the direction of the normal (or axial) and tangential fields so as to deduce the position of the magnet (1) within one period, and the absolute incremental probe (3), which counts the number of rotations of the magnetic field, i.e. the number of periods of the magnetic field. The combination of the two signals thus makes it possible to generate a position sensor of very great precision.

Figure 9:
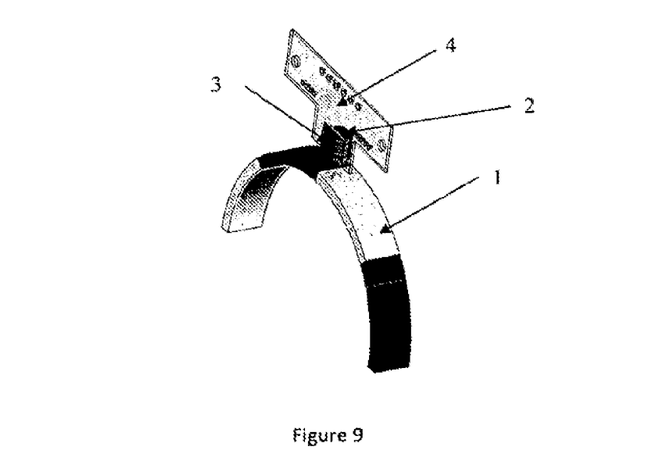
in FIG. 9, a less than 360° angular displacement sensor according to the invention.

Likewise, again, FIG. 9 shows a rotary version in the form of a magnet tile or arch (1), having an alternation of North-South magnetized poles of radial magnetization direction, and a printed circuit (4) supporting the two probes (2 and 3). By making a tile of limited angular width and by multiplying the number of magnetization periods, it is thus possible to increase the precision of the sensor obtained. The present invention is particularly relevant in the context of combining the position sensor (A) with a torque sensor (B), as described for example in the patent application FR 2 872 896 filed by the applicant and shown in FIG. 10.

Figure 10:
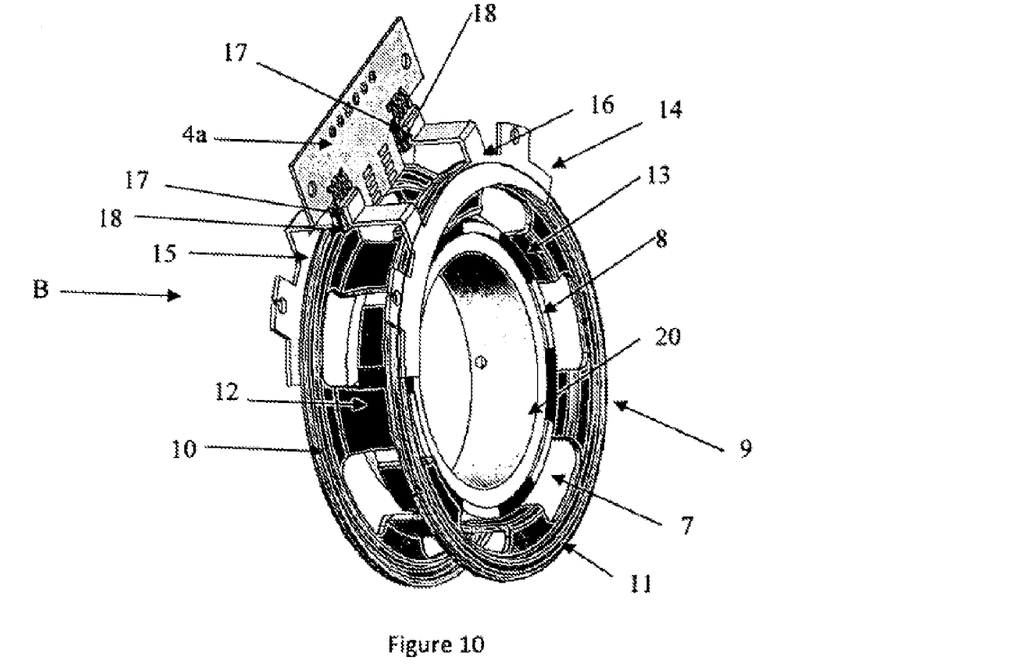
in FIG. 10, a torque sensor of the prior art that can be combined with a position sensor according to the invention.

This torque sensor (B) is used to detect the relative rotation of two shafts (5 and 6) that are linked by a torsion bar (19) and is composed of:

a rotor first magnetic structure (7) comprising a plurality of magnets (8) fixed to a yoke (20) and magnetized radially;

a stator second magnetic structure (9) comprising two concentric rings (10, 11) having a plurality of imbricated teeth (12, 13) that extend axially;

a stationary collecting third structure (14) consisting of two flux closure pieces (15, 16) that are extended by branches (21, 22) that close up to form two measurement gaps (17) in which two magnetosensitive elements (18) are placed. This duplicated configuration serves to provide a redundancy function, but a single gap with a single magnetosensitive element is conceivable.

Figure 11:
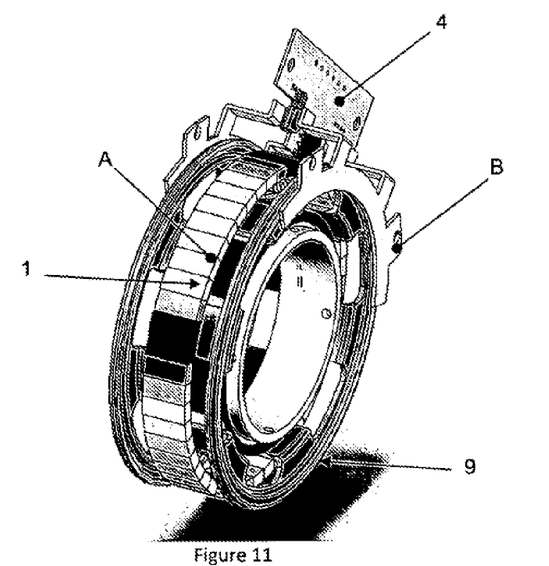
in FIG. 11, the combination of the torque sensor according to FIG. 10 and a position sensor according to the invention and as shown in FIG. 1 and according to a first embodiment.

When combined with the position sensor (A), it is then composed, as shown in FIG. 11, of a fourth structure made up of a multipole magnetized magnet (1) with a continuously variable magnetization direction that can be overmolded onto the plastic part (not shown) that supports the second magnetic structure (9) of the torque sensor (B). Also present is a printed circuit (4a) that supports the probe (2), the absolute incremental probe (3), necessary for operation of the position sensor (A), and the magnetosensitive third probe (18), which measures the amplitude of the field for use of the torque sensor (B).

In this configuration shown in FIG. 11, the multipole magnet (1) having a continuously variable magnetization direction is fastened to the stator structure (9). This novel sensor has the same dimensions as a conventional torque sensor, but it also measures, absolutely and over several revolutions, the angular position of the shaft (6) which is fastened to the stator part (9).

Figure 12:
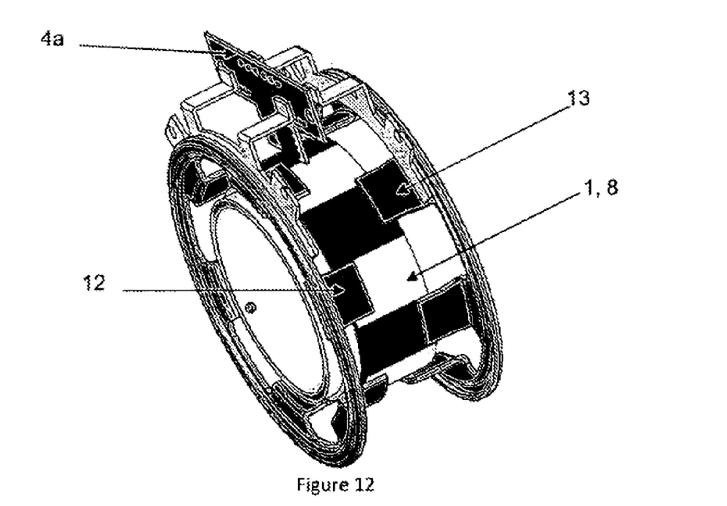
in FIG. 12, the combination of the torque sensor according to FIG. 10 and a position sensor according to the invention and as shown in FIG. 1 and according to a second embodiment.

FIG. 12 shows another conceivable combination of the position sensor (A) with a torque sensor (B) as described above. In this embodiment, the magnet (8) is a multipole magnet of radial magnetization. Thus, this magnet (1) is the source of the field for the torque sensor (B) and for the position sensor (A), all the probes (2, 3, 18) being placed on the same printed circuit (4a). This has the advantage of having no more than a single magnet (1) with, however, the drawback of increasing the axial dimension.

Figure 13:
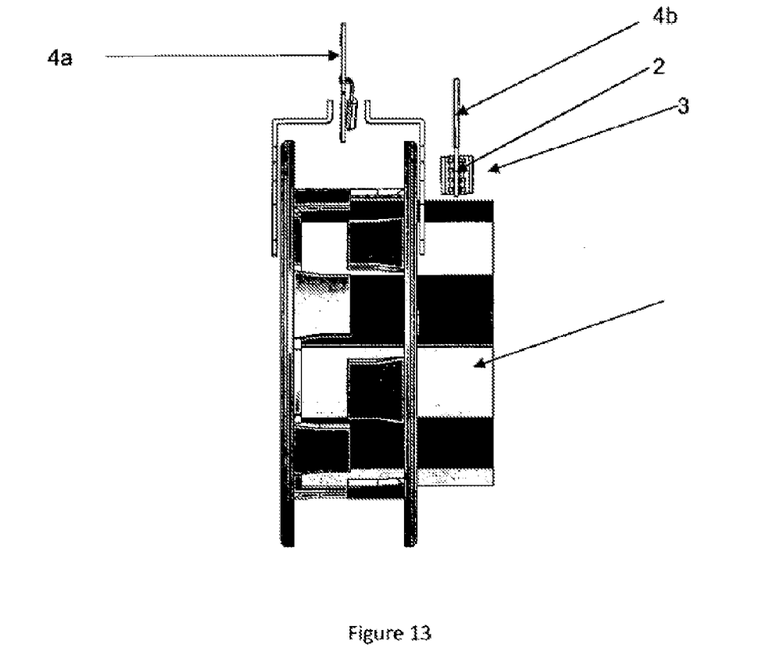
in FIG. 13, the combination of the torque sensor according to FIG. 10 and a position sensor according to the invention and as shown in FIG. 1 and according to a third embodiment.

Although the influence of the teeth (12 and 13) of the torque sensor may be prejudicial to correct operation of the position sensor, it is then possible to envisage another embodiment, as shown in FIG. 13, in which the single magnet (1, 8) is produced so as to extend beyond the stator assembly (9) in order to place the probes (2 and 3) on another printed circuit (4b). The assembly makes it possible for the position sensor (A) to be made insensitive to the torque sensor (B).

Figure 14:
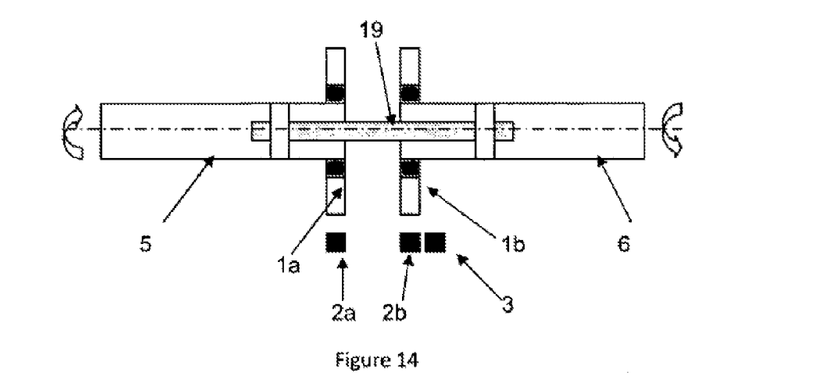
in FIG. 14, a torque sensor according to a fourth embodiment using a position sensor according to the invention; and in FIG. 15, the magnetic components of a torque sensor according to FIG. 14.

Finally, FIG. 14 shows an innovative torque/position sensor again based on the use of a position sensor (A) as shown in FIG. 1. In this embodiment, two multipole magnets (1a and 1b) having continuously variable magnetization directions are used.

On a steering column, the input shaft (5) and the output shaft (6) are linked by a torsion bar (19), which means that we are able to deduce the torque from the measurement of the angle between the input shaft (5) and the output shaft (6). The present invention proposes integrating, on each shaft (5 and 6), a multipole magnet having a continuously variable magnetization direction (respectively 1a and 1b) with N pairs of poles and one magnetosensitive probe (2a and 2b respectively) which measures the radial (or axial) and tangential components of the magnetic field generated facing each magnet (1a and 1b) and one absolute incremental probe (3) facing a magnet (1b) linked either to the input shaft (5) or to the output shaft (6).

In this embodiment, the difference in angular position between the first shaft (5), in position $\Theta_1$, and the second shaft (6), in position $\Theta_2$, is determined by a combination of the signals from the probes (2a and 2b), such that:

$$\frac{GG_1 B_{t1} - G_2 B_{t2}}{GB_{n1} + B_{n2}} = -\tan\left(\frac{N}{2}(\Theta_1 - \Theta_2)\right)$$

Figure 15:
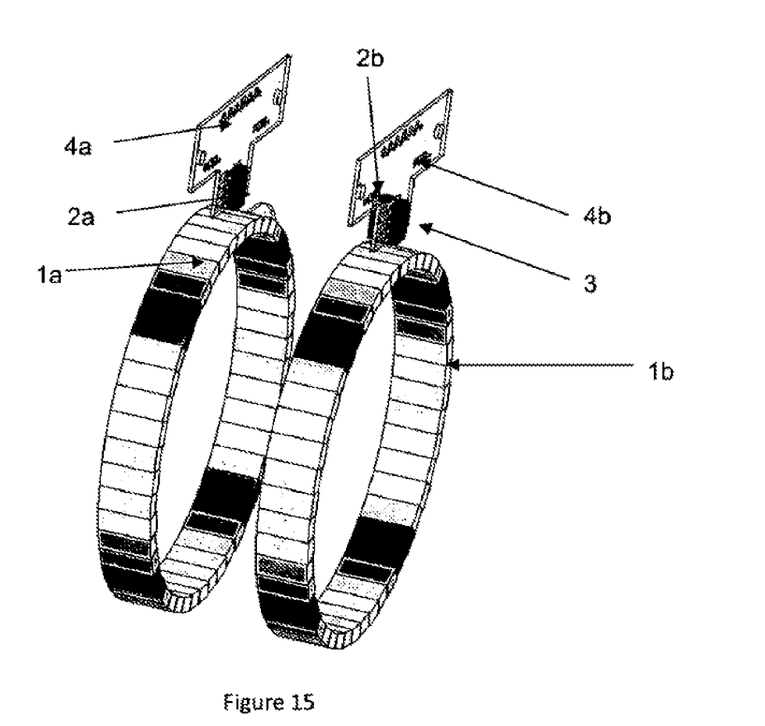

The parameters in this equation have already been described in the above text. In this embodiment, the probe (2a) is placed on a first printed circuit (4a) and the probes (2b and 3) are placed on a second printed circuit (4b), as shown in FIG. 15.

The invention claimed is:
1. A magnetic position sensor comprising:
at least a magnetized unit having multiple magnetic periods;
a first magnetosensitive probe; and
a second magnetosensitive probe, the first and second magnetosensitive probes being stationary relative to each other;

the magnetized unit being movable with respect to the first and second magnetosensitive probes over a displacement travel and having an absolute position at each instant;

the magnetized unit producing, in the vicinity of the first magnetosensitive probe, a magnetic field having, on the one hand, a normal component and, on the other hand, at least one tangential or transverse component varying sinusoidally and periodically over N periods distributed over the displacement travel, N being a number greater than 1;

the first magnetosensitive probe being capable of measuring at least two of the three components of the magnetic field so as to determine a first datum indicative of the position of the magnetized unit relative to any one magnetic period of the multiple magnetic periods; and the second magnetosensitive probe being capable of measuring, in an absolute, incremental and reversible manner, a number of complete rotations of the magnetic field so as to determine a second datum indicative of the magnetized unit being positioned within one particular magnetic period of the multiple magnetic periods, whether or not this second magnetosensitive probe is powered, and the sensor including a circuit for calculating the absolute position of the magnetized unit from the first datum and the second datum.

2. The magnetic position sensor as claimed in claim 1, wherein the magnetized unit has a magnetization direction that can vary continuously along the displacement direction.

3. The magnetic position sensor as claimed in claim 2, wherein the magnetized unit has a magnetization direction varying linearly along the displacement direction.

4. The magnetic position sensor as claimed in claim 1, wherein the magnetized unit has an alternation of North-South magnetized poles.

5. The magnetic position sensor as claimed in claim 1, wherein the magnetized unit has a unidirectional magnetization and has at least one of its dimensions that varies in a non-constant manner.

6. The rotary magnetic position sensor as claimed in claim 1, wherein the magnetized unit has an annular shape and a magnetization direction in the plane perpendicular to the rotation axis of the magnetized unit.

7. The rotary magnetic position sensor as claimed in claim 1, wherein the magnetized unit has a disk shape and a magnetization direction perpendicular to the plane of the disk.

8. The rotary magnetic position sensor as claimed in claim 1, wherein the magnetized unit has an arc-like shape that extends over an angular width of less than 360°.

9. A linear magnetic position sensor as claimed in claim 1, wherein the magnetized unit extends linearly along the displacement direction.

10. The magnetic position sensor as claimed in claim 1, wherein the first and second magnetosensitive probes are positioned on one and the same printed circuit.

11. A magnetic assembly in combination with an automotive steering column, the combination comprising:
(a) a first shaft;
(b) a second shaft;
(c) a torsion bar, the magnetic assembly detecting a torque between the first shaft and the second shaft connected by the torsion bar;
(d) a position sensor comprising:
at least a magnetized unit;
a first magnetosensitive probe;
a second magnetosensitive probe, the first and second magnetosensitive probes being stationary relative to each other;
the magnetized unit being movable with respect to the first and second magnetosensitive probes over a displacement travel and having an absolute position at each instant;
the magnetized unit producing, in the vicinity of the first magnetosensitive probe, a magnetic field having, on the one hand, a normal component and, on the other hand, at least one tangential or transverse component varying sinusoidally and periodically over N periods distributed over the displacement travel, N being a number greater than 1;
the first magnetosensitive probe being capable of measuring at least two of the three components of the magnetic field so as to determine a first datum relating to the position of the magnetized unit;
the second magnetosensitive probe being capable of measuring, in an absolute, incremental and reversible manner, a number of complete rotations of the magnetic field so as to determine a second datum relating to the position of the magnetized unit, whether or not this second magnetosensitive probe is powered;
the position sensor operably calculating the absolute position of the magnetized unit from the first datum and the second datum;
(e) a rotor first magnetic structure fastened to the first shaft and comprising a plurality of radially oriented magnets;
(f) a stator second structure fastened to the second shaft and comprising two rings extended by imbricated and axially oriented teeth; and
(g) a stationary collecting third structure consisting of two flux closure pieces that define at least one gap in which at least a third magnetosensitive probe is placed.

12. The magnetic assembly as claimed in claim 11, wherein the position sensor further includes a circuit connected to the first magnetosensitive probe and the second magnetosensitive probes and wherein at least one of the circuit and the second magnetosensitive probe calculates the absolute position of the magnetized unit from the first datum and the second datum.

13. The magnetic assembly as claimed in claim 11, in which the magnetized unit is in the form of a ring located around the teeth.

14. The magnetic assembly as claimed in claim 11, in which a plurality of magnets belong to the magnetized unit.

15. A magnetic assembly comprising:
(a) a first shaft;
(b) a second shaft;
(c) a torsion bar, the magnetic assembly operably detecting a torque between the first shaft and the second shaft connected by the torsion bar;
(d) a position sensor comprising:
a magnetized unit including probes, the magnetized unit being movable with respect to the probes over a displacement travel and having an absolute position at each instant;
the magnetized unit producing, in the vicinity of a first of the probes, a magnetic field having, on the one hand, a normal component and, on the other hand, at least one tangential or transverse component varying sinusoidally and periodically over N periods distributed over the displacement travel, N being a number greater than 1;

the first probe being capable of measuring at least two components of the magnetic field so as to determine a first datum relating to the position of the magnetized unit;

a second of the probes being capable of measuring, in an absolute, incremental and reversible manner, a number of complete rotations of the magnetic field so as to determine a second datum relating to the position of the magnetized unit, whether or not this second probe is powered; and (e) an auxiliary magnetized unit;

(f) an auxiliary magnetosensitive probe;

(g) the magnetized unit of the position sensor being fastened to the first shaft so that the position sensor is capable of delivering first position information items relating to an angular position $\Theta_1$ of this first shaft;

(h) the auxiliary magnetized unit being fastened to the second shaft and able to move with respect to the auxiliary magnetosensitive probe, this auxiliary probe being capable of delivering second position information items relating to an angular position $\Theta_2$ of the second shaft; and (i) a circuit calculating the absolute position of the magnetized unit from the first datum and the second datum and a difference in angular position between the first shaft and the second shaft from a combination of the first and second position information items, such that:

$$\frac{GG_1 B_{t1} - G_2 B_{t2}}{GB_{n1} + B_{n2}} = -\tan\left(\frac{N}{2}(\Theta_1 - \Theta_2)\right)$$

where:
  $B_{n1}$ is the normal component, measured by the first probe, of the field generated by the magnetized unit;
  $B_{n2}$ is the normal component, measured by the auxiliary probe, of the field generated by the auxiliary magnetized unit;
  $B_{t1}$ is the tangential component, measured by the first probe, of the field generated by the magnetized unit;
  $B_{t2}$ is the tangential component, measured by the auxiliary probe, of the field generated by the auxiliary magnetized unit; and $|B_{n1}|=G_1|B_{t1}|, |B_{n2}|=G_2|B_{t2}|$ and $G|B_{n1}|=|B_{n2}|$.

* * * * *